United States Patent [19]

Dulaney et al.

[11] Patent Number: 5,152,907
[45] Date of Patent: Oct. 6, 1992

[54] SOLVENT SYSTEMS FOR USE IN OIL AND GAS WELLS

[75] Inventors: Clarence L. Dulaney, Missouri City; Michael C. Lysandrou, Houston, both of Tex.

[73] Assignee: Amoco Corporation, Chicago, Ill.

[21] Appl. No.: 704,915

[22] Filed: May 21, 1991

Related U.S. Application Data

[63] Continuation of Ser. No. 523,196, May 14, 1990, abandoned, which is a continuation of Ser. No. 287,703, Dec. 19, 1988, abandoned, which is a continuation of Ser. No. 83,596, Aug. 7, 1987, abandoned, which is a continuation of Ser. No. 425,382, Sep. 28, 1982, abandoned.

[51] Int. Cl.$^5$ .............................................. E21B 43/27
[52] U.S. Cl. .............................. 252/8.552; 252/8.553
[58] Field of Search ........................... 252/8.552, 8.553

[56] References Cited

U.S. PATENT DOCUMENTS

| | | | |
|---|---|---|---|
| 2,356,205 | 8/1944 | Blair et al. | 252/8.552 |
| 3,402,770 | 9/1968 | Messenger | 252/8.552 |
| 3,477,511 | 11/1969 | Jones et al. | 252/8.552 |
| 3,819,520 | 6/1974 | Jones et al. | 252/8.552 |
| 4,090,562 | 5/1978 | Maly et al. | 252/8.552 X |
| 4,207,193 | 6/1980 | Ford et al. | 252/8.552 |
| 4,882,075 | 11/1989 | Jones | 252/8.553 |
| 4,919,827 | 4/1990 | Harms | 252/8.553 |
| 4,925,497 | 5/1990 | Thierheimer, Jr. | 252/8.552 X |

OTHER PUBLICATIONS

Kirk-Othmer Encyclopedia of Chemical Technology, vol. 4, pp. 338-343.
Kirk-Othmer Encyclopedia of Chemical Technology, vol. 9, pp. 338, 342-355.
Kirk-Othmer Encyclopedia of Chemical Technology, vol. 19, pp. 198, 204-205.
Kirk-Othmer Encyclopedia of Chemical Technology, vol. 19, pp. 221-224.

*Primary Examiner*—Gary L. Geist
*Attorney, Agent, or Firm*—Marcy M. Lyles

[57] ABSTRACT

There is provided a solvent system for use in oil wells and gas wells, which solvent system comprises a hydrocarbon solvent, such as a mixture of xylenes, a substantially water-soluble alcohol, such as a mixture of methanol and a propanol, and a substantially oil-soluble alcohol, such as a $C_8$-alcohol or $C_8$-alcohol mixture.

The system can also contain a non-ionic dispersant, such as an oxyalkylated alcohol.

12 Claims, No Drawings

SOLVENT SYSTEMS FOR USE IN OIL AND GAS WELLS

This is a continuation of copending application Ser. No. 523,196 filed on May 14, 1990, now abandoned, which is a continuation of copending application Ser. No. 287,703 filed on Dec. 19, 1988, now abandoned, which is a continuation of copending application Ser. No. 083,596 filed on Aug. 7, 1987, now abandoned, which is a continuation of copending application Ser. No. 425,382 filed Sep. 28, 1982, now abandoned.

BACKGROUND OF THE INVENTION

It is known that certain oil wells produce crude oils that contain substantial amounts of asphaltenic and/or paraffinic hydrocarbons, which hydrocarbons can form undesirable plugs in the well bore or in the well tubing associated with the oil well. Often, the oil well can become plugged with deposits of acid-soluble material, such as calcium carbonate or clays combined with such asphaltenic and/or paraffinic hydrocarbons.

For a substantial number of years, oil wells have been acidized by an aqueous solution of an acid, such as hydrochloric acid, hydrofluoric acid, acetic acid, and the like, and mixtures thereof. Generally, a mutual solvent for oil and water is used in association with such acid. Of course, the acid can contain, or can be preceded by, or can be followed by such mutual solvent. However, the normally used mutual solvents are not very good at dissolving or stripping asphaltenic hydrocarbons.

Loomis, et al., in U.S. Pat. No. 2,124,530; Dunlap, in U.S. Pat. No. 3,254,718; and Gidley, in U.S. Pat. Nos. 3,481,404 and 3,548,945, provide examples of such mutual solvents. A typical mutual solvent should avoid emulsions, displace the oil, and leave the solid surfaces water-wet. Jones, et al., in U.S. Pat. No. 3,819,520, provide a mixed alcohol solvent that is suitable for acidizing oil and gas wells. This mixed alcohol is a mixture of an octanol and a lower alcohol, which may be ethanol, a propanol, or tertiary butanol. Jones, et al., disclose that such a mixture may be used with, ahead of, or behind aqueous acid solutions that are employed to acidize wells.

There has now been found a solvent system that readily strips or dissolves asphaltenes, permitting the acid to contact and solubilize the acid-soluble portion of the solids formation.

SUMMARY OF THE INVENTION

There is provided a solvent system for use in acidizing and cleanup in oil wells and gas wells. The solvent system comprises a hydrocarbon solvent, such as an aromatic hydrocarbon, a paraffinic hydrocarbon, a naphthenic hydrocarbon, or any combination thereof, a substantially water-soluble alcohol, such as methanol, ethanol, a propanol, a butanol, or any mixture thereof, and a substantially oil-soluble alcohol, such as one or more $C_6$-alcohols through $C_{15}$-alcohols. A preferred hydrocarbon solvent comprises one or more xylenes. A preferred substantially water-soluble alcohol comprises methanol and isopropyl alcohol. A preferred substantially oil-soluble alcohol comprises one or more $C_8$-alcohols.

The hydrocarbon solvent can be present in an amount from 0 wt % to about 90 wt %; the substantially water-soluble alcohol, in an amount within the range of about 0 wt % to about 80 wt %; and the substantially oil-soluble alcohol, in an amount within the range of about 0 wt % to about 25 wt %, each amount being based upon the weight of the solvent system.

The solvent system can also contain a non-ionic dispersant, such as oxyalkylated alcohol, an oxyalkylated phenol, or a polyol, and can be present in an amount within the range of about 0 wt % to about 15 wt %, based on the weight of the solvent system.

DESCRIPTION AND PREFERRED EMBODIMENT

Various oil wells may be plugged with deposits of acid-soluble material combined with asphaltenic and/or paraffinic hydrocarbons. Examples of acid-soluble material are calcium carbonate and certain clays. Mutual solvents, which are normally used in the acidizing of oil and gas wells, are not efficient at dissolving or stripping asphaltenic hydrocarbons.

Oil-based drilling muds are used at least during the last phase of drilling deep gas wells. Such drilling muds keep the clays of the formation from being contacted by water-based fluids and keep the clays from swelling as a result of change in the ionic atmosphere.

Often, the formation can be damaged by blockage with bentonite and/or barite from the oil-based mud. Of course, these solids will be coated by the oil that is used in the mud. Clean up of such deposits requires a solvent that will strip off the oil and provide solids-wetting and suspending ability, thus enabling the solids to break loose and move out of the formation and the well bore. If the asphaltenic and/or paraffinic deposits can be removed from the oil or gas well, oil or gas production can be increased.

There has now been found a solvent system which effectively aids the removal of asphaltenic and/or paraffinic damage from oil or gas wells and leaves the solid formation in a desirable water-wet condition. Consequently, the acid can then contact the acid-soluble damage in the oil or gas well.

Broadly, the solvent system of the present invention comprises a hydrocarbon solvent, a substantially water-soluble alcohol, and a substantially oil-soluble alcohol. It can contain, in addition, a non-ionic dispersant.

The hydrocarbon solvent of the solvent system of the present invention can be an aromatic hydrocarbon, e.g., one or more xylenes, a paraffinic hydrocarbon, e.g., kerosene, or a naphthenic hydrocarbon, e.g., methylcyclohexane, or any combination thereof. An aromatic hydrocarbon is preferred for the removal of asphaltenic or paraffinic material. Typically, the hydrocarbon solvent is present in the composition in an amount within the range of about 0 wt % to about 90 wt %, based upon the weight of the composition or solvent system. Preferably, the hydrocarbon solvent is present in an amount within the range of 10 wt % to about 70 wt %, based upon the weight of the composition.

The substantially water-soluble alcohol of the solvent system can be methanol, ethanol, a propanol, a butanol, or any mixture thereof. The preferred alcohols are methanol and a propanol, such as isopropyl alcohol, or mixtures thereof. The substantially water-soluble alcohol is present in the solvent system in an amount within the range of about 0 wt % to about 80 wt %, based upon the weight of the solvent system. Such alcohol is preferably present in an amount within the range of about 10 wt % to about 50 wt %, based upon the weight of the solvent system.

The substantially oil-soluble alcohol of the solvent system of the present invention is generally a mixture of various $C_6$-alcohols through $C_{15}$-alcohols. It can be a relatively pure single component. Furthermore, it can be a straight-or branched-chain, naphthenic, or alkyl aromatic alcohol or alcohols, or mixtures thereof. The preferred substantially oil-soluble alcohol is a mixture of $C_6$-through $C_{10}$-paraffinic alcohols. More preferably, such substantially oil-soluble alcohol is $C_8$-alcohol. The term "$C_8$-alcohol" refers to a mixture of alcohols which comprise from 10 wt % to about 100 wt % $C_8$-alcohol and about 90 wt % to about 0 wt % $C_6$-alcohols through $C_{10}$-alcohols. In many cases, the $C_8$-alcohols will contain traces of $C_4$-alcohols and $C_{12}$-alcohols. It is to be understood that $C_8$-alcohols can be straight or branched-chain or a combination of straight- and branched-chains and can be primary, secondary, or tertiary alcohols. Such substantially oil-soluble alcohol is present in the solvent system in an amount within the range of about 0 wt % to about 25 wt %, based upon the weight of the solvent system. Preferably, such alcohol is present in an amount within the range of about 5 wt % to about 15 wt %, based upon the weight of the solvent system.

Suitable non-ionic dispersants for the composition of the present invention, if used, are oxyalkylated alcohols, oxyalkylated phenols, or a polyol. The non-ionic dispersant (wetting agent) is present in an amount within the range of about 0 wt % to about 15 wt %, based upon the weight of the solvent system. Preferably, such dispersant is present in an amount within the range of about 0 wt % to about 10 wt %, based upon the weight of the solvent system.

The composition of the present invention can be used with, ahead of, or behind the aqueous acid solutions that are employed in the well drilling operation.

According to the present invention, there is provided a solvent system comprising a hydrocarbon solvent, a substantially water-soluble alcohol, and a substantially oil-soluble alcohol, said hydrocarbon solvent being an aromatic hydrocarbon, a paraffinic hydrocarbon, a naphthenic hydrocarbon, or any combination thereof and being present in an amount within the range of about 0 wt % to about 90 wt %, said substantially water-soluble alcohol being methanol, ethanol, a propanol, a butanol, or any mixture thereof and being present in an amount within the range of about 0 wt % to about 80 wt %, and said substantially oil-soluble alcohol being a mixture of various $C_6$-alcohols through $C_{15}$-alcohols and being present in an amount within the range of about 0 wt % to about 25 wt %, each amount being based upon the weight of said solvent system. The solvent system can contain in addition a non-ionic dispersant. An example of such non-ionic dispersant is an oxyalkylated alcohol, an oxyalkylated phenol, or a polyol. Such dispersant is present in an amount within the range of about 0 wt % to about 15 wt %, based upon the weight of the solvent system.

Preferably, the hydrocarbon solvent is present in an amount within the range of about 10 wt % to about 50 wt %, the substantially water-soluble alcohol is present in an amount within the range of from about 10 wt % to about 75 wt %, the substantially oil-soluble alcohol is present in an amount within the range of about 5 wt % to about 15 wt %, and the non-ionic dispersant, when used, is present in an amount of up to about 10 wt %, each amount being based upon the total weight of the solvent system.

A preferred embodiment of the solvent system of the present invention comprises a hydrocarbon solvent, a substantially water-soluble alcohol, and a substantially oil-soluble alcohol, said hydrocarbon solvent being a mixture of xylenes and being present in an amount within the range of about 0 wt % to about 90 wt %, said substantially water-soluble alcohol being a mixture of methanol and isopropyl alcohol and being present in an amount within the range of about 0 wt % to about 80 wt %, and said substantially oil-soluble alcohol being primarily one or more $C_8$-alcohols and being present in an amount within the range of about 0 wt % to about 25 wt %, each amount being based upon the weight of said solvent system. The methanol can be present in the mixture of methanol and isopropyl alcohol in an amount of up to 30 wt %, based upon the weight of said mixture of methanol and isopropyl alcohol.

The composition of the present invention, which can be used for both onshore and offshore drilling operations, is used in conjunction with acids that are normally employed in well acidizing, such as hydrochloric acid, mixed hydrochloric and hydrofluoric acids (mud acid), sulfamic acid, and organic acids, such as acetic acid and formic acid. The composition can be used to clean up oil and gas wells, well bores, and well tubing. It can be used suitably as a miscible solvent in helping to put organic deposits into the aqueous (acid) phase and causing inorganic surfaces to be water-wet. A miscible system is obtained, if the solvent system of the present invention is used with an acid in a composite that contains from about 75 wt % to about 85 wt % solvent and about 25 wt % to about 15 wt % acid solution. In addition, the solvent system of the present invention is somewhat effective in a non-miscible system. A suitable non-miscible system employs about 10 wt % to about 25 wt % solvent and from about 90 wt % to about 75 wt % acid solution.

The following examples are being presented for the purpose of illustration only and are not intended to limit the scope of the present invention.

EXAMPLE I

In this example, a preferred embodiment of the solvent system of the present invention was prepared. This embodiment was a composite of 20.0 wt % xylenes as an aromatic solvent, 9.3 wt % mixture of $C_6$-alcohols through $C_{10}$-alcohols, which mixture was primarily $C_8$-alcohols, 20.0 wt % methanol, and 50.7 wt % isopropanol. The composite was percolated down through a bed of bentonite clay containing asphaltenic hydrocarbons. This clay material was composed of deposits that had been scraped out of well bores of one or more oil wells in Wyoming. It was treated with n-heptane to remove the crude oil mixed therewith. A reduction in the color of the bed of clay and an increase in the color of the solvent indicated that the asphaltenes were being washed successfully from the bed. The bed was left in a water-wet state. This was shown by passing water down through the bed after the solvent had been removed therefrom.

EXAMPLE II

The solvent system of Example I was mixed with an aqueous solution of 15% hydrochloric acid. The mixture contained 80 parts by volume of solvent to 20 parts of acid solution.

This solvent-acid system was added to a paraffin-inorganic mixture. The system was found to dissolve the paraffinic coating from the paraffin-inorganic mixture and to allow the acid to attack the inorganic matter.

For comparative purposes, a mixture containing hydrochloric acid and a commercially-obtained mutual solvent, an ethoxylated butanol, in the same proportions as the solvent system of the present invention, was added to a second portion of the paraffin-inorganic mixture.

It was found that the attack by the acid of the inorganic matter when using the solvent system of the present invention was faster than when using the composite containing the commercial mutual solvent.

EXAMPLE III

Bottle tests were conducted with a preferred embodiment of the composition of the present invention, identified hereinafter as Composition B, in the presence of a highly asphaltenic crude, a Tensleep crude from Wyoming. Composition B was made up of 20 wt % methanol, 9.3 wt % 2-octanol (capryl alcohol), 50.7 wt % isopropyl alcohol and 20 wt % of a commercially-obtained mixed xylene stream, which contained primarily meta-xylene and ortho-xylene.

In addition, bottle tests were conducted with two prior art compositions, namely (1) ethylene glycol monobutyl ether (EGMBE) and (2) a commercial solvent system sold by Amoco Chemicals Corporation and identified as "A-SOL", and an experimental solvent system, identified hereinafter as Composition A. Composition A contained 25 wt % methanol, 11.6 wt % 2-octanol (capryl alcohol), and 63.4 wt % isopropyl alcohol.

In each case, 300 ml of aqueous phase, i.e., solvent plus 15% hydrochloric acid solution, were mixed with 100 ml of the Tensleep crude oil in a pint bottle. The mixture was then permitted to settle overnight (approx. 16 hr). The viscosity of the oil layer was obtained by using a Brookfield viscometer with a No. 2 spindle at 12 rpm. The results of these tests are presented hereinbelow in Table I.

TABLE I

Viscosities of Oil Layers

| Vol of 15% HCl, cc | Solvent | Vol of Solvent, cc | Vol of Crude, cc | Viscosity of Crude Layer, Cps |
| --- | --- | --- | --- | --- |
| 0 | — | 0 | 100 | 183 |
| 300 | — | 0 | 100 | 670 |
| 285 | EGMBE | 15 | 100 | 418 |
| 270 | EGMBE | 30 | 100 | 410 |
| 255 | EGMBE | 45 | 100 | 355 |
| 240 | EGMBE | 60 | 100 | 330 |
| 225 | EGMBE | 75 | 100 | 318 |
| 285 | A | 15 | 100 | 323 |
| 270 | A | 30 | 100 | 220 |
| 255 | A | 45 | 100 | 220 |
| 240 | A | 60 | 100 | 180 |
| 225 | A | 75 | 100 | 168 |
| 285 | A-SOL | 15 | 100 | 418 |
| 270 | A-SOL | 30 | 100 | 348 |
| 255 | A-SOL | 45 | 100 | 285 |
| 240 | A-SOL | 60 | 100 | 203 |
| 225 | A-SOL | 75 | 100 | 168 |
| 285 | B | 15 | 100 | 180 |
| 270 | B | 30 | 100 | 178 |
| 255 | B | 45 | 100 | 105 |
| 240 | B | 60 | 100 | 93 |
| 225 | B | 75 | 100 | 63 |

Examination of the viscosities in Table I reveals that the viscosities furnished by the samples employing Composition B, i.e., the composition of the present invention, were less than the viscosities provided by the samples employing either the prior art solvents or the experimental solvent system at equivalent concentrations. Lower viscosities indicate a superior solvent system.

The solvent system of the present invention removes the asphaltenic and/or paraffinic deposits from oil or gas wells and leaves the solids formation in a water-wet condition. It enables the acid to contact the acid-soluble damage in oil or gas wells that are blocked or plugged with combined asphaltenic and acid-soluble damage. It water-wets the formation and is more effective on asphaltenic deposits than the conventional mutual solvents. In addition, the solvent system is a suitable clean-up solvent for gas wells that have been damaged by blocked by oil-based drilling mud. In such gas wells, it water-wets the solids formation.

What is claimed is:

1. A solvent system for use in oil and gas well operations, which system comprises a hydrocarbon solvent, a substantially water-soluble alcohol, and a substantially oil-soluble alcohol, said hydrocarbon solvent being an aromatic hydrocarbon, a paraffinic hydrocarbon, a naphthenic hydrocarbon, or any combination thereof and being present in an amount of about 20 wt %, said substantially water-soluble alcohol being a mixture of about 20 wt % methanol and about 50.7 wt % isopropanol and said substantially oil-soluble alcohol being a mixture of various $C_6$-alcohols through $C_{10}$-alcohols and being present in an amount of about 9.3 wt %, each amount being based upon the weight of said solvent system.

2. A solvent system for use in oil and gas well operations, which system comprises a hydrocarbon solvent component, a substantially water-soluble alcohol component, and a substantially oil-soluble alcohol component, said hydrocarbon solvent component being an aromatic hydrocarbon, a paraffinic hydrocarbon, a naphthenic hydrocarbon, or any combination thereof and being present in an amount within the range of about 10 wt % to about 50 wt %, said substantially water-soluble alcohol component comprising 20 wt % to about 50 wt % methanol and said substantially oil-soluble alcohol component being a mixture of various $C_6$-alcohols through $C_{15}$-alcohols and being present in an amount within the range of about 5 wt % to about 15 wt %, each amount being based upon the weight of said solvent system.

3. The solvent system according to claim 2, which solvent system contains also a non-ionic dispersant component, said dispersant component being an oxyalkylated alcohol, an oxyalkylated phenol, or a polyol and being present in an amount up to about 15 wt %, based upon the weight of said solvent system.

4. The solvent system according to claim 3 wherein said hydrocarbon solvent comprises one or more xylenes.

5. The solvent system according to claim 3 wherein said substantially oil-soluble alcohol comprises a mixture of $C_5$-alcohols through $C_{10}$-alcohols.

6. The solvent system according to claim 3 wherein said dispersant is present in an amount of up to about 10 wt % based upon the weight of said solvent system.

7. The solvent system according to claim 2 wherein said hydrocarbon solvent component comprises one or more xylenes.

8. The solvent system according to claim 2 wherein said substantially oil-soluble alcohol component comprises a mixture of $C_6$-alcohols through $C_{10}$-alcohols.

9. The solvent system according to claim 2 wherein the substantially water-soluble alcohol component consists of methanol and one or more alcohols selected from the group consisting of propanols and butanols.

10. The solvent system according to claim 9 wherein said substantially water-soluble alcohol component consists of a mixture of methanol and isopropyl alcohol, said methanol being present in an amount of up to about 30 wt %, based upon the weight of said mixture, and wherein said substantially oil-soluble alcohol component comprises 2-octanol.

11. The solvent system according to claim 9 wherein said substantially water-soluble alcohol component is a mixture of methanol and isopropyl alcohol, said methanol being present in an amount of up to about 30 wt %, based upon the weight of said mixture, and wherein said substantially oil-soluble alcohol component comprises 2-octanol.

12. The solvent system according to claim 11, which solvent system contains also a non-ionic dispersant component wherein said dispersant component is present in an amount of up to about 10 wt %, based upon the weight of said solvent system.

* * * * *